Patented Sept. 18, 1945

2,384,910

UNITED STATES PATENT OFFICE 2,384,910

VINYLIDENE CHLORIDE COMPOSITIONS

Alden W. Hanson and William C. Goggin, Midland, Mich., assignors to The Dow Chemical Company, Midland, Mich., a corporation of Michigan No Drawing. Application July 18, 1941,
Serial No. 403,022

2 Claims. (Cl. 260—27)

This invention relates to thermoplastic compositions comprising polymeric vinylidene chloride products modified with natural resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono- and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379; and 2,160,931 to 2,160,948, inclusive.

Natural resins are any of the solid or semi-solid organic substances occurring chiefly as exudants of trees or plants. Shellac is an exception, being an excretion of an insect. Some of the resins are obtained from trees and are called gum resins, others are found buried in the earth, from past ages, and are known as fossil resins. The term "gum" is applied loosely to various plant exudations which include the true gums, natural resins and oleoresins. As herein used, the term "natural resin" includes all of those resinous substances normally so defined, and also those water-insoluble resins and oleoresins of commerce known as gums, such as for example, gum mastic, gum elemi, and gum sandarac.

According to the present invention, natural resins are incorporated with a polymeric vinylidene chloride product to produce a mass which can be molded or extruded to form articles having a waxy "handle" and high gloss. For example, a natural resin may be incorporated with a polymeric vinylidene chloride product having a softening point only slightly below its decomposition point to produce a mass that can be extruded at relatively low temperatures and pressures to form valuable articles, threads, bands, filaments, foils, and the like, which retain the high tensile strength and toughness shown by the parent polymeric vinylidene chloride product. Furthermore, addition of natural resins to a polymeric vinylidene chloride product, in many cases, has a plasticizing effect, particularly at elevated temperatures, and produces a mass that has thermoplastic properties superior to the polymeric vinylidene chloride product alone, and can be molded or shaped to form useful articles having a tough, durable finish with a high gloss, and which retain a resistance to chemicals typical of polymeric vinylidene chloride products. Some of the natural resins, though apparently compatible at fusion temperatures, become incompatible at room temperature with polymeric vinylidene chloride products. Such resins yield masses that can be molded or extruded to form articles that vary from translucent to opaque when cold, and which have a tough, glossy finish.

The addition of the natural resins to the polymeric vinylidene chloride product may be effected by any of several methods. For example, the polymeric vinylidene chloride product and the particular natural resin to be employed may be mixed or ground together in a ball mill or other suitable mixer commonly employed in the plastic art, or they may be added to the polymer on hot rolls in a method similar to compounding rubber compositions. Another satisfactory method of incorporating the natural resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

*Example 1*

2.5 grams of rosin WW, a natural resin having a melting point of 62°–68° C. and 5.0 grams of 1,2-epoxy-3 (2-phenylphenoxy) propane, to serve as a heat stabilizer, were incorporated with 20 ml. of acetone. To the resulting product was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.014 inch, prepared from this material were flexible glossy threads and had a tensile strength above 38,000 pounds per square inch.

Example 2

A composition was prepared as in Example 1 but substituting East India Macassar nubs, pale, a natural resin having a melting point of 122°–136° C., for the rosin WW. The solvent medium employed was benzene. The composition could easily be molded or extruded and filaments, having a diameter of 0.019 inch, prepared from this material were opaque flexible threads and had a tensile strength above 39,000 pounds per square inch.

Example 3

A composition was prepared as in Example 1 but substituting Pontianak copal, bold scraped, a natural resin having a melting point of 141°–158° C., for the rosin WW. The composition could easily be molded or extruded and filaments, having a diameter of 0.026 inch, prepared from this material were flexible opaque white threads and had a tensile strength above 31,000 pounds per square inch.

Example 4

A composition was prepared as in Example 1 but substituting beta orange shellac gum, for the rosin WW. The composition could easily be molded or extruded and filaments, having a diameter of 0.014 inch, prepared from this material were flexible translucent threads with a waxy handle and had a tensile strength above 30,000 pounds per square inch.

Example 5

A composition was prepared as in Example 1 but substituting Boea copal, hard bold white, a natural resin having a melting point of 101°–111° C., for the rosin WW. The composition could easily be molded or extruded and filaments, having a diameter of 0.018 inch, were tough translucent waxy threads and had a tensile strength above 38,000 pounds per square inch.

Example 6

A composition was prepared as in Example 1 but substituting East India Batu, nubs and chips, a natural resin having a melting point of 144°–154° C., for the rosin WW. The solvent medium employed was benzene. The composition could easily be molded or extruded and filaments, having a diameter of 0.017 inch, were flexible translucent glossy threads and had a tensile strength above 43,000 pounds per square inch.

Example 7

A composition was prepared as in Example 1 but substituting Manila "MA," a natural resin having a melting point of 96°–104° C., for the rosin WW. The composition could easily be molded or extruded and filaments, having a diameter of 0.0175 inch, prepared from this material were flexible translucent threads with a waxy handle and had a tensile strength above 49,000 pounds per square inch.

Example 8

A composition was prepared as in Example 1 but substituting Quickover shellac gum, a natural resin, for the rosin WW. The composition could easily be molded or extruded and filaments, having a diameter of 0.017 inch, prepared from this material were flexible, tough threads with a glossy finish and had a tensile strength above 45,000 pounds per square inch.

Example 9

2.5 grams of gum elemi, an oleoresin melting below 45° C., and 5 grams of 1,2-epoxy-3(2-phenylphenoxy) propane, to serve as a heat stabilizer, were incorporated with 20 ml. of benzene. To the resulting product was added 42.5 grams of a co-polymer consisting of 90 per cent vinylidene chloride and 10 per cent of vinyl chloride. The mixture was ground until thoroughly blended, and then dried. The composition could easily be molded or extruded and filaments, having a diameter of 0.014 inch, prepared from this material were flexible tough glossy threads and had a tensile strength above 43,000 pounds per square inch.

Example 10

A composition was prepared as in Example 9 but substituting gum mastic, a natural resin having a melting point of 110° C. for the gum elemi. The composition could be easily molded or extruded and filaments, having a diameter of 0.015 inch, prepared from this material were translucent flexible threads with a waxy handle and had a tensile strength above 36,000 pounds per square inch.

Example 11

A composition was prepared as in Example 9 but substituting gum acroides, a natural resin, having a melting point of 124°–135° C., for the gum elemi. The solvent medium employed was alcohol. The composition could easily be molded or extruded and filaments, having a diameter of 0.0175 inch, prepared from this material were opaque flexible glossy threads and had a tensile strength above 44,000 pounds per square inch.

Example 12

3.0 grams of gum sandarac, a natural gum resin having a melting point of 137°–158° C., and 2.0 grams of a co-polymer, consisting of 90 per cent vinylidene chloride and 10 per cent vinyl chloride were placed in a test tube and heated to a fusion temperature. The product was a tough brown-colored homogeneous mass.

Example 13

4.5 grams of gum elemi, an oleoresin melting below 45° C., and 0.5 gram of a co-polymer as in Example 12 were heated to a fusion temperature. The product was a soft non-tacky homogeneous mass.

Example 14

24 parts by weight of a solution consisting of 50 per cent by weight white shellac in ethyl alcohol, and 7 parts by weight of di-(alpha-phenylethyl) ether were incorporated with 10 parts of alcohol. To the resulting product was added 69 parts by weight of a co-polymer consisting of 90 per cent vinylidene chloride and 10 per cent vinyl chloride. The mixture was ground until thoroughly blended and then dried. The composition could easily be molded or extruded and filaments, having a diameter of 0.013 inch, prepared from this material were tough flexible threads and had a tensile strength above 38,000 pounds per square inch.

Example 15

1 part by weight of shellac, 2 parts of di-(alpha-phenylethyl) ether to serve as a heat stabilizer, and 5 parts of dibenzyl sebacate to serve as a plasticizer, were incorporated with 10 parts of alcohol. To this solution was added 92 parts by weight of a co-polymer consisting of 90 per cent vinylidene chloride and 10 per cent vinyl chloride. The mixture was ground until thoroughly blended and then dried. The composition could easily be molded or extruded and filaments, having a diameter of 0.014 inch, prepared from this material were flexible glossy threads and had a tensile strength above 41,000 pounds per square inch.

*Example 16*

3 parts by weight of shellac and 3 parts by weight di-(alpha-phenylethyl) ether, to serve as a heat stabilizer were incorporated with 10 parts of alcohol. To this product was added 94 parts by weight of a co-polymer consisting of 90 per cent vinylidene chloride and 10 per cent vinyl chloride. The mixture was ground until thoroughly blended and then dried. The composition could easily be molded or extruded and filaments, having a diameter of 0.013 inch prepared from this material were flexible tough threads and had a tensile strength above 52,000 pounds per square inch.

*Example 17*

12 parts by weight of a solution consisting of 50 per cent by weight white shellac in ethyl alcohol, and 7 parts by weight of di-(alpha-phenylethyl) ether were incorporated with 10 parts of alcohol. To this product was added 81 parts by weight of a co-polymer consisting of 90 per cent vinylidene chloride and 10 per cent vinyl chloride. The mixture was ground until thoroughly blended and then dried. The compositions could easily be molded or extruded and filaments having a diameter of 0.018 inch prepared from this material were glossy flexible threads and had a tensile strength above 38,000 pounds per square inch.

The compositions which contain relatively low proportions of the natural resins have improved molding and extruding properties, while the compositions which contain relatively large proportions of the resins will, depending upon the type of resin used, range from soft plastics to tough solid masses. The latter compositions may be advantageously used in preparing improved lacquers, varnishes or paints.

The proportion of natural resins to be employed in the new polymeric vinylidene chloride product compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibility at all temperatures met in service and be sufficiently hard and tough to withstand abrasion. Similarly, lacquer coatings must be hard, tough, and possess good flexibility. The exact proportions of the natural resin to be employed in preparing the new compositions will vary with the use requirements. When the product is to be molded or extruded to form useful articles; threads, bands, filaments, foils, or the like, the amount of the natural resin used will ordinarily vary from about 0.5 to about 40 per cent, and more specifically between about 2 and about 7.5 per cent, based on the weight of the polymeric vinylidene chloride product used. When, however, it is desired to produce a composition which is substantially more compatible with many of the commonly used lacquer solvents, the amount of natural resin employed may vary from about 5 to about 90 per cent.

Articles prepared from many of the new compositions, particularly when extruded in the form of threads or bands, have an increased resistance to shock at low temperatures. As examples of natural resins which produce this effect, there may be mentioned white shellac and gum sandarac. The shattering or shock test was carried out by fastening a length of an extruded thread to a shaft, rapidly rotating the shaft, and gradually moving a rigid member into the plane of rotation so that the thread slapped against the rigid member at each revolution of the shaft. The length of the unbroken thread remaining after one minute gives an indication of the resistance to shock. For example, a thread having a diameter of 0.030 inch prepared from the composition in Example 17 was fastened to a shaft in such a manner that a length of 6 inches was free to swing around when the shaft was rotated. The shaft was rotated at a speed of 2,700 revolutions per minute, and a stiff iron bar was gradually moved at an even rate toward the center of the plane of rotation so that the thread slapped against the bar. At the end of one minute the unbroken length of the thread was 4 inches. By way of contrast, when threads having the same diameter prepared from a composition which did not contain a natural resin were subjected to a similar treatment under identical conditions, the unbroken length of thread remaining after the experiment was 2¾ inches. The tests were carried out at a temperature of −3° C.

While the above examples show the preparation of compositions from a polymeric vinylidene chloride product, consisting of a co-polymer of 90 per cent vinylidene chloride and 10 per cent vinyl chloride incorporated with natural resins, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. Compounds applicable for this purpose include 1,2-epoxy-3(2-phenylphenoxy) propane, allyl-disulfide, 2-chloroallyl-disulfide, 2.2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers, and the like has also been found to be useful and desirable when used in such amount that the desirable mechanical properties of the product are not affected.

As will be seen from the above description, the properties of polymeric vinylidene chloride products can be varied widely, according to the amount and type of natural resin incorporated therein, to produce products that are useful in the preparation of articles of all kinds. The hereindescribed compositions have, among others, the following advantages: (1) they have low molding and softening temperatures well below their thermal decomposition temperatures; (2) they may be molded or extruded at relatively low pressure to form valuable articles, filaments, threads, bands, or foils, which are flexible and have a high resistance to impact at low temperatures; (3) they are substantially more compatible with many lacquer solvents than the polymeric vinylidene chloride product alone; (4) they are heat-stable masses which may be worked to produce articles having a tough durable and glossy finish; and (5) articles prepared from them may range from transparent through translucent to opaque in appearance.

Other modes of applying the principle of our invention may be employed instead of those explained, change being made as regards the materials employed, provided the product recited in the following claims be obtained.

We therefore point out and distinctly claim as our invention:

1. A thermoplastic composition containing a polymer of vinylidene chloride wherein the vinylidene chloride constitutes at least 70 per cent of the polymer, and about 7.5 per cent of white shellac, based on the weight of the polymer.

2. A thermoplastic composition containing a copolymer of from about 5 to about 30 per cent of vinyl chloride and correspondingly from about 95 to about 70 per cent of vinylidene chloride, and about 7.5 per cent of white shellac, based on the weight of the copolymer, the said composition being characterized by yielding extruded articles with increased resistance to shock at low temperatures as compared with similar articles produced from the same copolymer without the shellac.

ALDEN W. HANSON.
WILLIAM C. GOGGIN.